United States Patent
Chiou et al.

(10) Patent No.: US 9,746,897 B2
(45) Date of Patent: Aug. 29, 2017

(54) METHOD FOR CONTROLLING A MULTI-CORE CENTRAL PROCESSOR UNIT OF A DEVICE ESTABLISHING A RELATIONSHIP BETWEEN DEVICE OPERATIONAL PARAMETERS AND A NUMBER OF STARTED CORES

(71) Applicant: Chiun Mai Communication Systems, Inc., New Taipei (TW)

(72) Inventors: Bu-Da Chiou, New Taipei (TW); Yi-Cheng Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 48 days.

(21) Appl. No.: 14/734,669

(22) Filed: Jun. 9, 2015

(65) Prior Publication Data
US 2016/0116962 A1    Apr. 28, 2016

(30) Foreign Application Priority Data
Oct. 23, 2014 (CN) .......................... 2014 1 0572622

(51) Int. Cl.
G06F 1/00    (2006.01)
G06F 1/32    (2006.01)

(52) U.S. Cl.
CPC ............ *G06F 1/3206* (2013.01); *G06F 1/324* (2013.01); *G06F 1/3212* (2013.01); *G06F 1/3287* (2013.01); *Y02B 60/165* (2013.01)

(58) Field of Classification Search
CPC ..... G06F 1/3206; G06F 1/3212; G06F 1/3287
USPC .......................................................... 713/324
See application file for complete search history.

(56) References Cited

U.S. PATENT DOCUMENTS

| | | | |
|---|---|---|---|
| 2006/0156040 A1* | 7/2006 | Naveh | G06F 1/3203 713/300 |
| 2010/0011363 A1* | 1/2010 | Mukherjee | G06F 1/206 718/103 |
| 2010/0174923 A1* | 7/2010 | Houlihan | G06F 1/3215 713/300 |
| 2012/0216058 A1* | 8/2012 | Wells | G06F 1/3206 713/322 |
| 2014/0108838 A1* | 4/2014 | Wei | G06F 9/505 713/322 |
| 2014/0181554 A1* | 6/2014 | Manne | G06F 1/3234 713/323 |

FOREIGN PATENT DOCUMENTS

TW      201413595      4/2014

\* cited by examiner

*Primary Examiner* — Robert Cassity
(74) *Attorney, Agent, or Firm* — Steven Reiss

(57) ABSTRACT

A method for controlling a central processor unit (CPU) of an electronic device includes establishing a corresponding relationship among operational parameters of the electronic device and a number of started cores of the CPU. Current operational parameters of the electronic device are acquired. The number of started cores of the CPU corresponding to the current operational parameters is adjusted based on the corresponding relationship. Then, the CPU is controlled to run with the adjusted number of started cores.

6 Claims, 3 Drawing Sheets

METHOD FOR CONTROLLING A MULTI-CORE CENTRAL PROCESSOR UNIT OF A DEVICE ESTABLISHING A RELATIONSHIP BETWEEN DEVICE OPERATIONAL PARAMETERS AND A NUMBER OF STARTED CORES

CROSS-REFERENCE TO RELATED APPLICATIONS

This application claims priority to Chinese Patent Application No. 201410572622.1 filed on Oct. 23, 2014, the contents of which are incorporated by reference herein.

FIELD

The subject matter herein generally relates to the field of electronic device control technology, and particularly to adjusting parameters of a central processing unit (CPU) of an electronic device.

BACKGROUND

Electronic devices, such as mobile phones, are increasingly equipped with more functions. As a result, more powerful applications that consume a great amount of power are provided in the electronic devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
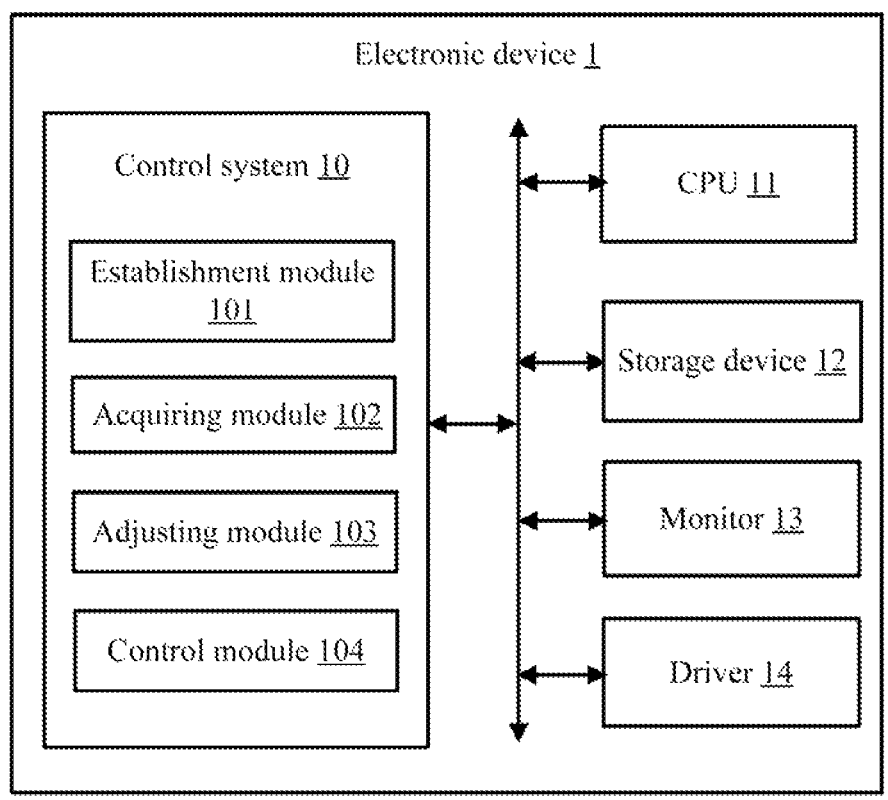
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. The term "comprising," when utilized, means "including, but not necessarily limited to", it specifically indicates open-ended inclusion or membership in the so-described combination, group, series and the like. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

Figure 2:
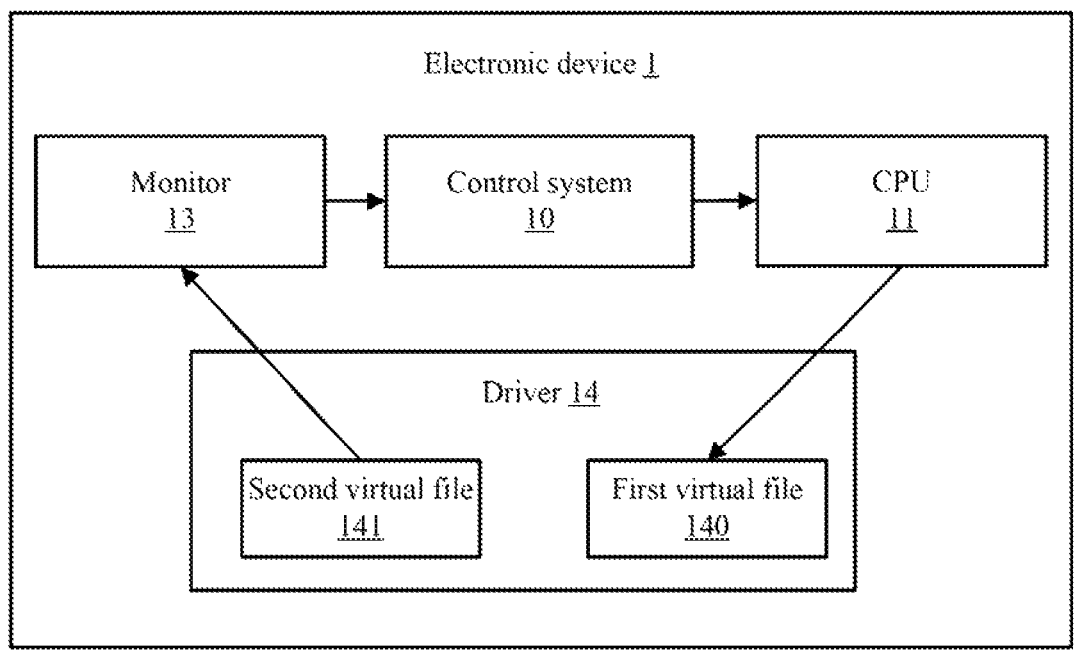
FIG. 2 is a diagrammatic view of one embodiment of data flow in an electronic device when controlling a CPU of the electronic device.

FIG. 1 is a block diagram of an example embodiment of an electronic device. FIG. 2 is a diagrammatic view of one embodiment of data flow in the electronic device when controlling a central processing unit (CPU) of the electronic device. FIG. 1 and FIG. 2 illustrate an electronic device 1 can include a control system 10, a CPU 11, a storage device 12, a monitor 13, and a driver 14. The electronic device 1 can be a smart phone, a personal digital assistant (PDA), a tablet computer, or other electronic device. FIG. 1 illustrates only one example of the electronic device, other examples can include more or fewer components than illustrated, or have a different configuration of the various components in other embodiments.

In at least one embodiment, the storage device 12 can include various types of non-transitory computer-readable storage mediums. For example, the storage device 12 can be an internal storage system, such as a flash memory, a random access memory (RAM) for temporary storage of information, and/or a read-only memory (ROM) for permanent storage of information. The storage device 12 can also be an external storage system, such as a hard disk, a storage card, or a data storage medium. The CPU 11 may be a microprocessor, or other data processor chip that performs functions of the electronic device 1. In at least one embodiment, the CPU 11 may be a multi-core processor, and the multi-core processor may have two cores, four cores, six cores, eight cores, ten cores, or more.

In at least one embodiment, the monitor 13 can acquire operational parameters of the electronic device 1. The operational parameters can include a CPU usage rate, an average length of a waiting queue of the CPU, a temperature of the CPU, a remaining capacity of a battery of the electronic device 1, and a ratio of power consumption to performance of the CPU 11. In one embodiment, the monitor 13 can be a temperature sensor which acquires a current temperature of the CPU 11.

The CPU 11 can generate a command signal according to the operational parameters, and send the command signal to the driver 14 to adjust a working state of the CPU 11. In at least one embodiment, the working state of the CPU 11 can include a frequency and a number of started cores of the CPU 11.

The driver 14 includes a first virtual file 140, and a second virtual file 141. In at least one embodiment, the driver 14 can adjust a frequency and a number of started cores of the CPU 11 by reading and/or writing a preset instruction corresponding to the command signal into the first virtual file 140. For example, in a Linux system, the driver 14 can write an instruction "1" to a path /sys/devices/system/cpu/cpu0/online in the first virtual file 140 to start a core cpu0 of the CPU 11 or write an instruction "0" to a path /sys/devices/system/cpu/cpu0/online in the first virtual file 140 to stop the core cpu0. In addition, the driver 14 can write a frequency number to a path /sys/devices/system/cpu/cpu0/cpufreq/scaling_cur_freq in the first virtual file 140 to set a frequency of the started core cpu0 of the CPU 11.

The driver 14 can store updated operational parameters into the second virtual file 141, and send the updated operational parameters to the monitor 13 from the second virtual file 141. When the frequency and the number of started cores of the CPU 11 are adjusted, the operational parameters of the electronic device 1 can be updated.

The control system 10 can divide an executing stage of the CPU 11 into one or more executing sub-stages, and establish a corresponding relationship among operational parameters of the electronic device 1, a frequency of the CPU 11, and a number of started cores of the CPU 11 in each executing sub-stage, then, the control system 10 can control the CPU 11 to run at an adjusted frequency with an adjusted number of started cores according to the corresponding relationship.

In at least one embodiment, the control system 10 can include an establishment module 101, an acquiring module 102, an adjusting module 103, and a control module 104. The function modules 101, 102, 103, and 104 can include computerized codes in the form of one or more programs which are stored in the storage device 12. The CPU 11 executes the computerized codes to provide functions of the function modules 101-104.

The establishment module 101 divides an executing stage of the CPU 11 into one or more executing sub-stages. In at least one embodiment, the executing stage of the CPU 11 is divided according to usage ranges of the CPU 11. In at least one embodiment, the establishment module 101 divides the executing stage of the CPU 11 into two executing sub-stages, for example, executing sub-stage one, and executing sub-stage two. The usage range of the CPU 11 of the executing sub-stage one is from 0 to 90 percent, and the usage range of the CPU 11 of the executing sub-stage two is from 90 percent to 100 percent.

The establishment module 101 can establish a corresponding relationship among operational parameters of the electronic device 1, a frequency of the CPU 11, and a number of started cores of the CPU 11 in each executing sub-stage. In at least one embodiment, the operational parameters include a usage rate of the CPU 11, an average length of a waiting queue of the CPU 11, a temperature of the CPU 11, a remaining capacity of a battery of the electronic device 1, and a ratio of power consumption to performance of the CPU 11. In at least one embodiment, the monitor 13 can determine whether the usage rate of CPU 11 is within normal ranges. A continually high rate of CPU usage may indicate the need to adjust the number of started cores of the CPU 11. The average length of the waiting queue means the number of threads waiting to be executed by the CPU 11 in a predetermined time duration. The ratio of power consumption to performance of the CPU 11 can measure the energy efficiency of the electronic device 1.

In at least one embodiment, the corresponding relationship among the operational parameters, the frequency, and the number of the started cores can be stored in the storage device 12 as a table or a list. In at least one embodiment, each executing sub-stage defines one or more ranges of operational parameters. For example, the range of the usage rate of the CPU 11 of the first executing sub-stage may be from 0 to 90 percent, and the range of the temperature of the CPU 11 of the first executing sub-stage may be from 45 degree centigrade to 65 degree centigrade.

The acquiring module 102 acquires current operational parameters of the electronic device 1 periodically. In at least one embodiment, the acquiring module 102 acquires current operational parameters of the electronic device 1 from the monitor 13 periodically.

The adjusting module 103 adjusts a frequency and a number of started cores of the CPU 11 based on the current operational parameters according to the corresponding relationship. In at least one embodiment, according to the corresponding relationship, when the current operational parameters of the electronic device 1 is determined, the adjusting module 103 may select the executing sub-stage whose operational parameters ranges include the current operational parameters, and then the adjusting module 103 may adjust the frequency and the number of started cores of the CPU 11 according to the frequency and the number of started cores corresponding to the selected executing sub-stage.

The control module 104 can control the CPU 11 to run at the adjusted frequency with the adjusted number of started cores. In at least one embodiment, the CPU 11 generates a command signal according to the operational parameters, and sends the command signal to the driver 14 to adjust the frequency and the number of started cores of the CPU 11.

In at least one embodiment, the driver 14 includes a first virtual file 140, and a second virtual file 141. In at least one embodiment, the driver 14 can adjust the frequency and the number of started cores of the CPU 11 by reading and/or writing a preset instruction corresponding to the command signal into the first virtual file 140. For example, in a Linux system, the driver 14 can write an instruction "1" to a path /sys/devices/system/cpu/cpu0/online in the first virtual file 140 to start a core cpu0 of the CPU 11 or write an instruction "0" to a path /sys/devices/system/cpu/cpu0/online in the first virtual file 140 to stop the core cpu0. In addition, the driver 14 can write a frequency number to a path /sys/devices/system/cpu/cpu0/cpufreq/scaling_cur_freq in the first virtual file 140 to set a frequency of the started core cpu0 of the CPU 11.

Figure 3:
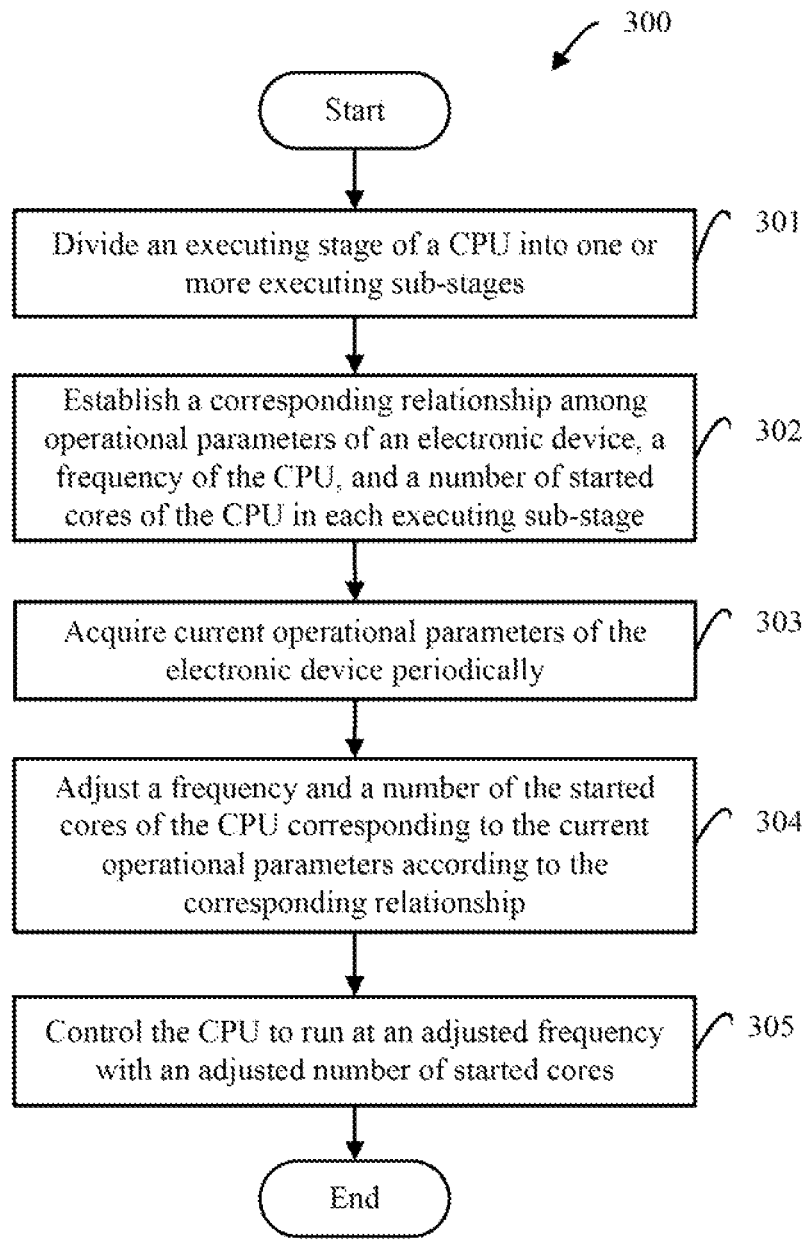
FIG. 3 is a flowchart of an example embodiment of a method for controlling a CPU of an electronic device of FIG. 1.

FIG. 3 is a flowchart of an example embodiment of a method for controlling the CPU of the electronic device of FIG. 1. An example method 300 is provided by way of example, as there are a variety of ways to carry out the method. The example method 300 described below can be carried out using the configurations illustrated in FIG. 1 and FIG. 2, and various elements of these figures are referenced in explaining the example method. Each block shown in FIG. 3 represents one or more processes, methods, or subroutines, carried out in the example method 300. Furthermore, the illustrated order of blocks is illustrative only and the order of the blocks can be changed according to the present disclosure. The example method 300 can begin at block 301. Depending on the embodiment, additional blocks can be utilized and the ordering of the blocks can be changed.

At block 301, an establishment module divides an executing stage of the CPU 11 into one or more executing sub-stages. In at least one embodiment, the executing stage of the CPU 11 is divided according to usage ranges of the CPU 11.

At block 302, the establishment module further establishes a corresponding relationship among operational parameters of the electronic device 1, a frequency of the CPU 11, and a number of started cores of the CPU 11 in each executing sub-stage. In at least one embodiment, the operational parameters include a usage rate of the CPU 11, an average length of a waiting queue of the CPU 11, a temperature of the CPU 11, a remaining capacity of a battery of the electronic device 1, and a ratio of power consumption to performance of the CPU 11. In at least one embodiment, the monitor 13 can determine whether the usage rate of the CPU 11 is within normal ranges. A continually high rate of usage may indicate the need to adjust the number of started cores of the CPU 11. The ratio of power consumption to performance of the CPU 11 can measure the energy efficiency of the electronic device 1.

At block 303, an acquiring module acquires current operational parameters of the electronic device 1 periodically. In some embodiments, the acquiring module acquires current operational parameters of the electronic device 1 from the monitor 13 periodically.

At block 304, an adjusting module adjusts a frequency and a number of started cores of the CPU 11 based on the current operational parameters according to the corresponding relationship. In at least one embodiment, according to the corresponding relationship, when the current operational parameters of the electronic device 1 is determined, the adjusting module may select the executing sub-stage whose operational parameters ranges include the current operational parameters, and then the adjusting module may adjust the frequency and the number of started cores of the CPU 11 according to the frequency and the number of started cores corresponding to the selected executing sub-stage.

At block 305, a control module controls the CPU 11 to run at the adjusted frequency with the adjusted number of started cores. In at least one embodiment, The CPU 11 can generate a command signal according to the operational parameters, and send the command signal to the driver 14 to adjust the frequency and the number of started cores of the CPU 11.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:
1. An electronic device comprising:
at least one central processing unit (CPU) having one or more cores; and
a non-transitory storage device that stores one or more programs which, when executed by the at least one CPU, cause the at least one CPU to:
establish a corresponding relationship between operational parameters of the electronic device, a frequency of the CPU, and a number of started cores of the CPU;
acquire current operational parameters of the electronic device;
adjust the frequency of the CPU and the number of started cores of the CPU corresponding to the current operational parameters according to the corresponding relationship, wherein the operational parameters of the electronic device comprise a usage rate of the CPU; and
control the CPU to run at the adjusted frequency with the adjusted number of started cores;
wherein when executed by the at least one CPU, the one or more programs farther cause the at least one CPU to:

define a plurality of executing sub-stages of the CPU, wherein each of the executing sub-stages defines one or more ranges of operational parameters of the electronic device;
select the executing sub-stage whose one or more ranges of operational parameters include the current operational parameters of the electronic device; and
adjust the number of started cores of the CPU according to the number of started cores corresponding to the selected executing sub-stage;
wherein the executing sub-stages of the CPU are divided according to the usage rate of the CPU;
wherein the plurality of executing sub-stages comprises a first executing sub-stage and a second executing sub stage, the usage rate of the CPU of the second executing sub-stage is greater than the usage rate of the CPU of the first executing sub-stage.

2. The electronic device according to claim 1, wherein the operational parameters of the electronic device further comprise an average length of a waiting queue of the CPU, a temperature of the CPU, a remaining capacity of a battery of the electronic device, and a ratio of power consumption to performance of the CPU.

3. A computer-implemented method executed by a central processing unit (CPU) of an electronic device for controlling the CPU, the method comprising:
establishing a corresponding relationship between operational parameters of the electronic device, a frequency of the CPU, and a number of started cores of the CPU;
acquiring current operational parameters of the electronic device;
adjusting the frequency of the CPU and the number of started cores of the CPU corresponding to the current operational parameters according to the corresponding relationship, wherein the operational parameters of the electronic device comprise a usage rate of the CPU; and
controlling the CPU to run at the adjusted frequency with the adjusted number of started cores;
defining a plurality of executing sub-stages of the CPU, wherein each of the executing sub-stages defines one or more ranges of operational parameters of the electronic device;
selecting the executing sub-stage whose one or more ranges of operational parameters include the current operational parameters of the electronic device; and
adjusting the number of started cores of the CPU according to the number of started cores corresponding to the selected executing sub-stage;
wherein the executing sub-stages of the CPU are divided according to the usage rate of the CPU;
wherein the plurality of executing sub-stages comprises a first executing sub-stage and a second executing sub-stage, the usage rate of the CPU of the second executing sub-stage is greater than the usage rate of the CPU of the first executing sub-stage.

4. The method according to claim 3, wherein the operational parameters of the electronic device further comprise an average length of a waiting queue of the CPU, a temperature of the CPU, a remaining capacity of a battery of the electronic device, and a ratio of power consumption to performance of the CPU.

5. A non-transitory storage medium storing instructions that, when executed by a central processing unit (CPU) of an electronic device, causes the CPU to perform a method for controlling the CPU, the method comprising:

establishing a corresponding relationship between operational parameters of the electronic device, a frequency of the CPU, and a number of started cores of the CPU;

acquiring current operational parameters of the electronic device;

adjusting the frequency of the CPU and the number of started cores of the CPU corresponding to the current operational parameters according to the corresponding relationship, wherein the operational parameters of the electronic device comprise a usage rate of the CPU; and controlling the CPU to run at the adjusted frequency with the adjusted number of started cores;

wherein the method further comprises:

defining a plurality of executing sub-stages of the CPU, wherein each of the executing sub-stages defines one or more ranges of operational parameters of the electronic device;

selecting the executing sub-stage whose one or more ranges of operational parameters include the current operational parameters of the electronic device; and adjusting the number of started cores of the CPU according to the number of started cores corresponding to the selected executing sub-stage;

wherein the executing sub-stages of the CPU are divided according to the usage rate of the CPU;

wherein the plurality of executing sub-stages comprises a first executing sub-stage and a second executing sub-stage, the usage rate of the CPU of the second executing sub-stage is greater than the usage rate of the CPU of the first executing sub-stage.

6. The non-transitory storage medium according to claim 5, wherein the operational parameters of the electronic device further comprise an average length of a waiting queue of the CPU, a temperature of the CPU, a remaining capacity of a battery of the electronic device, and a ratio of power consumption to performance of the CPU.

* * * * *